June 10, 1969  S. J. JANSSEN  3,448,605
DEVICE FOR MEASURING THE SURFACE TENSION OF LIQUIDS
Filed June 12, 1967
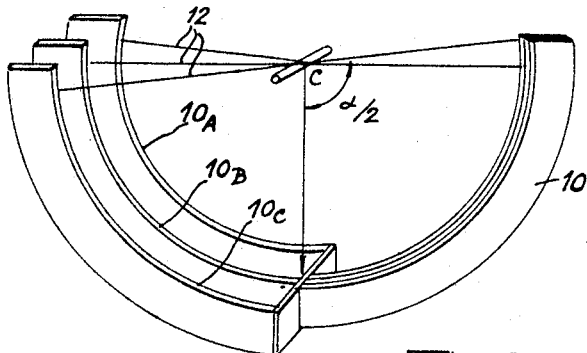
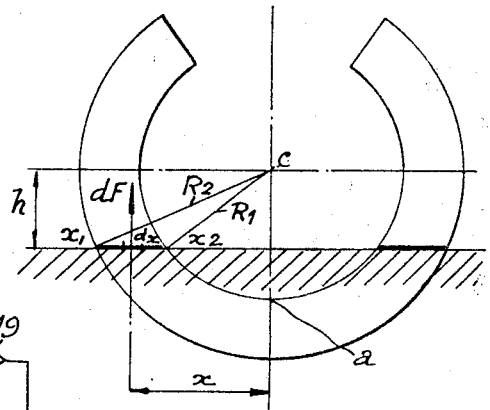
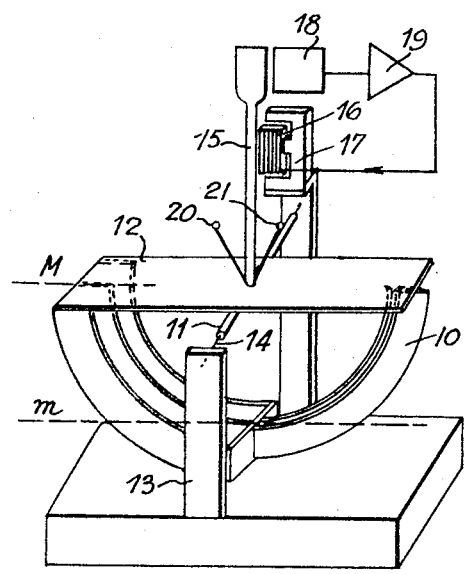
Inventor
Sylvain Jean Janssen
By Pierce, Schiffler & Parker
Attorneys

United States Patent Office 3,448,605
Patented June 10, 1969

3,448,605
DEVICE FOR MEASURING THE SURFACE TENSION OF LIQUIDS
Sylvain Jean Janssen, Paris, France, assignor to Compagnie des Compteurs, Paris, France, a French company
Filed June 12, 1967, Ser. No. 645,221
Claims priority, application France, June 21, 1966, 66,236, Patent 1,490,649
Int. Cl. G01n *11/00*
U.S. Cl. 73—64.4    3 Claims

ABSTRACT OF THE DISCLOSURE

A device for measuring the surface tension of liquids comprises a test body constituted by an assembly of a plurality of thin annular-like plates in the shape of a portion of an annulus, glued together for one half of their arcuate length and parallely spaced from each other for the other half, this assembly being rotatably mounted upon an axis perpendicular to their planes and pivoting around the center of said annulus and an automatic rebalancing power scale is provided for measuring the torque which results from the surface tension exerted on said axis when the test body is partially immersed in the liquid.

---

The present invention relates to a device for measuring the surface tension of liquids, which permits one to make the measurement in a highly accurate manner regardless of how deep the device is immersed in the liquid.

It is known that in many devices measuring capillary tensions, there is involved a measure of the attractive forces between a solid body, which is the test body and the liquid, the surface tension of which is to be measured. This procedure presents some disadvantages.

(a) When the test body, generally a thin plate is partially immersed in the liquid, this test body is subjected to Archimedean thrust which ruins the measurement. The measured force is then the resultant between the capillary forces and the upward thrusts. It is possible to take into account such thrusts, when the specific weight of the liquid as well as the volume of the immersed part of the test body are known. As the defect appears in every case whatever the immersed volume, be it small or large, the test body must exactly occupy such a place that the lower edge of it lies at the natural liquid level despite the existence of the meniscus due to the surface tension which causes the liquid to climb on its lateral walls. If a weight scale to which the test body is suspended is used to measure the force, said scale must then occupy a height which is variable with the liquid level so that the measuring device becomes quite complex in its structure.

(b) Even though the test body occupies the ideal positioning as defined hereinbefore, there appears a force, called a stiffness force, due to the variations of the Archimedean thrust. Actually, since the Archimedean thrust varies linearly with the immersed depth of the plate, this stiffness force varies according to the positioning of the plate within the liquid. It makes necessary a servo-positioning which may often times be difficult to achieve, particularly if the weight scale so used is an automatic rebalancing power scale. Actually, while the force due to the surface tension is a constant, the force P due to the Archimedean thrust varies linearly with the immersed depth X of the test body, and the stiffness force K is equal to the angular coefficient $dP/dX$ of the straight line $P=f(X)$.

The invention has for its object to obviate those disadvantages thanks to a particular structure given to the test body.

According to the invention, the device for measuring the surface tension of liquids comprises a test body constituted by an assembly of a plurality of thin annular-like plates in the shape of a portion of an annulus, glued together for one half of their arcuate length and parallely spaced from each other for the other half, this assembly being rotatably mounted upon an axis perpendicular to their planes and pivoting around the center of said annulus and means which are provided for measuring the torque which results from the surface tension exerted on said axis when the test body is partially immersed in the liquid.

As explained in the foregoing, the torque so produced is a constant one within a broad limit of immersion of the test body and whatever may be the angle that it may turn around its axis and also whatever may be the specific weight of the liquid. Thus, this torque depends only of the surface tension since the test body of the invention is not influenced by the Archimedean thrust which eliminates the stiffness force K.

Thanks to those particularly advantageous characteristics, it is then possible to make a device of an industrial type which at the same time is strong and of a low cost and simple manufacture, whereas conventional devices are weak and may only be used for laboratories.

The invention will be better understood when referring to the following disclosure and the accompanying drawing, given by way of an illustrative and by no means limitative example, in which:

FIGURE 1 is a perspective view of the test body for the device of the invention.

FIGURE 2 is an explanatory geometrical diagram.

FIGURE 3 is a diagrammatic perspective view of the measuring device.

FIGURE 1 shows the test body made by assembling a plurality of thin plates, here three in number. These plates, made from any material but preferably the nature of which be well moistened by the liquid for example in metal or in glass, have the shape of an open annulus limited by the length of the arc α of the plates. These plates are glued together on the angular α/2 portion from one end to constitute a single plate 10, while on the other α/2 portion, those plates 10A, 10B, 10C are maintained parallelly and slightly spaced one from another. C designates the geometric center of the wreath, reference numeral 11 is a rod establishing an axis passing through C perpendicularly to the plane of the plates 10, and to which the plates are connected by way of means in the form of a plate 12 so as to make a firm assembly articulated around the axis 11.

Before being immersed in the liquid, the device must be in an indifferent equilibrium around the rotational axis. The plates being heavier than the arm 15 and the mobile equipment (small blade of the position deviation indicator 18 and coil 16), counter-weights 20, 21 (FIG. 3) are provided, to restore the center of gravity of the device to the axis of rotation. Thus the rotational assembly will be indifferent to any gravity induced rotational force regardless of its position.

The test body works then according to the following way by reference to FIGURE 2 which represents in a plane the geometrical outline of one of the plates. In this figure, $R_1$ and $R_2$ designate the two radii of the inner and outer circles defining the annulus, $h$ is the height separating the level of the liquid from the center C, $x_1$ and $x_2$ the abscissae relatively to the vertical of C of the intersecting points of the circles of radii $R_1$ and $R_2$ with the liquid level.

On an elementary part of abscissa $x$ of a length $dx$, the force $dF$ which is exerted because of the surface tension A of the liquid is:

$$dF = 2A dx$$

The resulting torque $d\Gamma$ relatively to the center C is then:

$$d\Gamma = 2A \cdot x dx$$

and when integrating for half a plate:

$$\Gamma = 2A \int_{x_1}^{x_2} x dx = A \cdot (x_1^2 - x_1^2) = A \cdot (R_1^2 - R_1^2)$$

If, structurally, one adopts for example on the left hand side three separated plates as on FIGURE 1, one has for the latter, a torque:

$$\Gamma_1 = 3A \cdot (R_2^2 - R_1^2)$$

and for the three glued together plates on the right hand side which are equivalent to only one plate, a torque:

$$\Gamma_2 = A \cdot (R_2^2 - R_1^2)$$

There thus appears a resulting torque:

$$\Gamma = 2A \cdot (R_2^2 - R_1^2)$$

or more generally, for $n$ parallel plates $$\Gamma = (n-1) \cdot A \cdot (R_2^2 - R_1^2)$$

One consequently sees that this torque, for a given test body, depends only on the surface tension A, and is actually independent:

Of the depth of immersion of the test body between the two limits $m$ and $M$ of FIGURE 3;

Of the angle and the test body may turn around its horizontal axis passing through C; thus there does not appear any stiffness force in the measuring servomechanism and thus an exact positioning of the device within the liquid is not necessary. It is only necessary that it be immersed up to the point $a$ and that at least the ends of the plates protrude above the level of the liquid;

Of the specific weight of the liquid.

The measure of the surface tension A is set thus brought about by measure of the torque $\Gamma$ exerted on the test body at the rotational axis.

Without being a limitation for the measure of the torque $\Gamma$, this measure may be made by the means described in FIGURE 3 which shows an automatic rebalancing power scale. The axis rod 11 of the test body is rotationally mounted on a cradle 13 resting in the bottom of the tank containing the liquid. The mounting of the axis rod 11 is made by way of supporting means 14, for example wires without torsion or knives or any other means that would introduce a drawback or return torque. The axis rod 11 carries the arm 15 which arm supports a mobile coil 16 associated with a rebalancing electromagnetic motor 17. Reference numeral 18 symbolizes a position variation indicator which may be made by a small reflecting paddle for a light beam so as to provide a signal applied to the input of a servoing mechanism to the amplifier 19. The amplifier 19 sends through the coil 16 a current which tends to restore the equilibrium of the arm 15, in a known manner, and which is then proportional to the torque $\Gamma$ exerted on the axis rod 11, and thus proportional to the surface tension A. By measuring the above mentioned current, the surface tension may thus be directly measured.

The device of the invention may thus be fixed in a tank to provide a continuous measurement of the value of the surface tension of the liquid contained in the tank, independently of the variations in the level or in the specific weight of this liquid, variations which may occur, for example, in industrial installations dealing with chemical products.

I claim:
1. A device for measuring the surface tension of liquids comprising a test body composed of an assembly of a plurality of thin plates in the shape of a portion of an annulus, said plates being adhered together on one half of the arc of the plates and parallely spaced on the other half, means mounting said plate assembly for rotation about an axis perpendicular to the planes of said plates and pivoting around the center of said annulus and means providing a measurement of the torque which results from the surface tension exerted on said axis when the test body is partially immersed in the liquid.

2. Measuring device according to claim 1 in which said measurement means are constituted by an automatic rebalancing power scale.

3. Measuring device according to claim 2 in which balancing means are provided to restore to the axis of the test body, the center of gravity of the test body and of the means to which said test body is connected to measure the torque resulting from the surface tension.

References Cited

UNITED STATES PATENTS 2,635,463  4/1953  Pouradier et al. _____ 73—64.4

FOREIGN PATENTS 1,211,821  3/1966  Germany.

LOUIS R. PRINCE, *Primary Examiner.*

JOSEPH W. ROSKOS, *Assistant Examiner.*